United States Patent [19]

Weiss et al.

[11] 4,231,446

[45] Nov. 4, 1980

[54] RESONATING CHAMBER

[75] Inventors: Thomas R. Weiss; Matthew R. Kennedy, both of Crystal River, Fla.

[73] Assignee: Tesserax Inc., Homosassa Springs, Fla.

[21] Appl. No.: 26,443

[22] Filed: Apr. 2, 1979

Related U.S. Application Data

[63] Continuation-in-part of Ser. No. 876,012, Feb. 8, 1978, abandoned.

[51] Int. Cl.³ .............................................. H05K 8/00
[52] U.S. Cl. ..................................... 181/148; 181/199
[58] Field of Search .............................. 181/148–156, 181/198, 199; 179/1 E; D14/33

[56] References Cited

U.S. PATENT DOCUMENTS

D. 225,865   1/1973   Sjostedt et al. ........................ D14/33
D. 226,567   3/1973   Sioles ..................................... D14/33

OTHER PUBLICATIONS

Audio Engineering, vol. 35, No. 11, Nov. 1951, pp. 34,36,38,59–64, Olson, H. F., "Direct Radiator Loudspeaker Enclosure".

*Primary Examiner*—L. T. Hix
*Assistant Examiner*—Benjamin R. Fuller
*Attorney, Agent, or Firm*—William A. Newton

[57] ABSTRACT

An acoustical reproducing apparatus is disclosed for high fidelity sound reproduction comprising a speaker unit in combination with a cabinet enclosure acting as a resonating chamber. The resonating chamber has a rhombic dodecahedron configuration having speaker-mounting openings located on two or more opposed rhombi, or with one or more corner thereof being truncated and terminated in a baffle plate having an opening for mounting the speaker unit, or with one or more elongated or shortened zone and provided with either of the foregoing means of mounting speaker units. The resonating chamber includes a plurality of rhombus-shaped and/or parallelogram-shaped panels.

14 Claims, 11 Drawing Figures

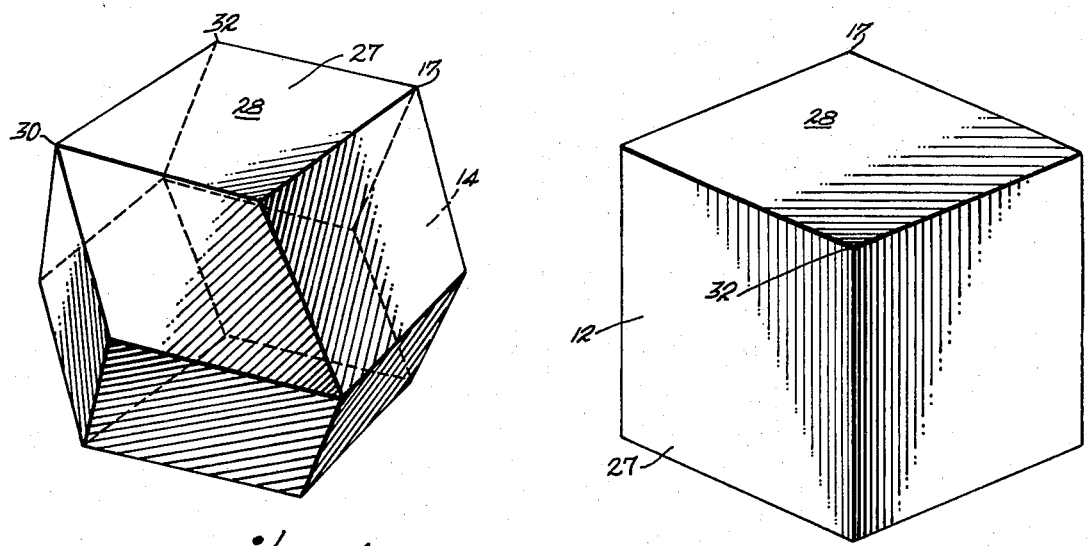
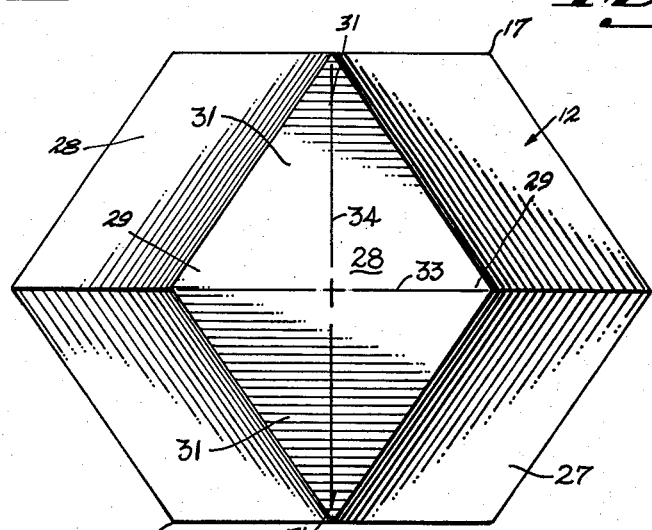
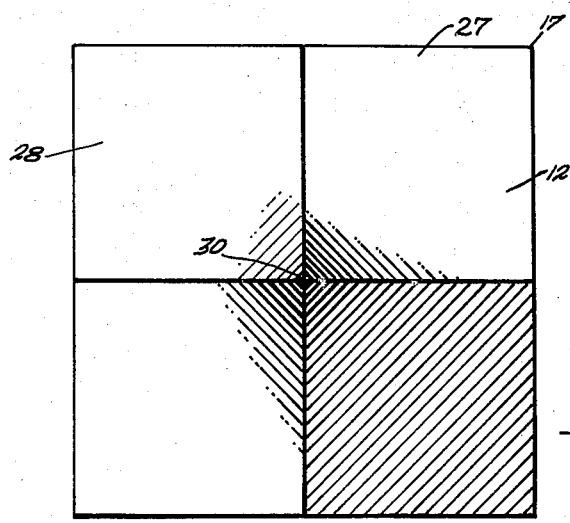

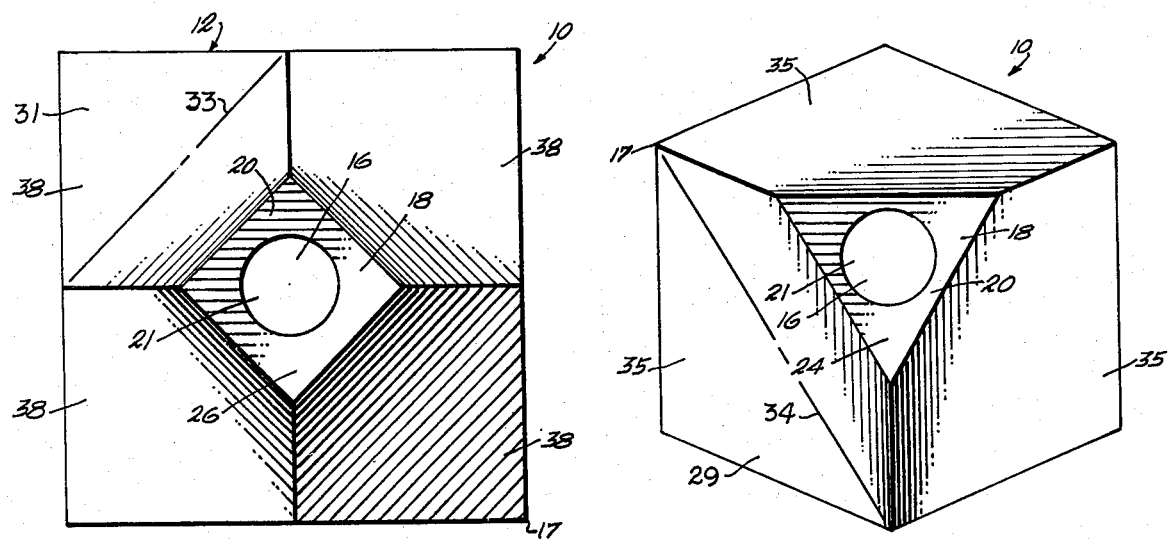
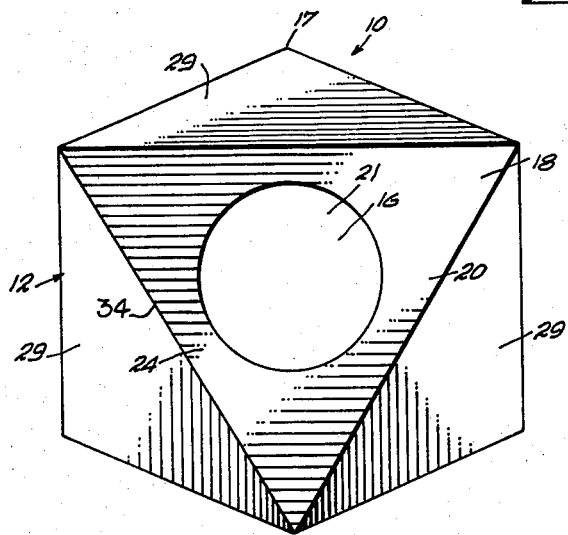

RESONATING CHAMBER

CROSS REFERENCE TO RELATED APPLICATION

This application is a continuation-in-part of an earlier filed application, Ser. No. 876,012, filed on Feb. 8, 1978 now abandoned.

FIELD OF THE INVENTION

The present invention relates to sound reproducing devices, and more specifically to the speaker enclosure for a speaker unit.

DESCRIPTION OF THE PRIOR ART

As is common knowledge, a speaker is an electromechanical device for converting a varying audio voltage into corresponding sound waves. Despite all the care taken in attempting to preserve the fidelity of an audio signal from the pickup to the output of an amplifier, the most expensive speakers with their associated speaker enclosures existing in the prior art invariably add a substantial amount of distortion to the signal. In other words, normally, even the most expensive speaker-enclosure systems of the prior art do not have the audio frequency response of the quality of its associated amplifier. The hi-fi and stereo industry in its attempt to decrease the gap in the accuracy and frequency response between the speaker-enclosure systems and the corresponding amplifier have developed speakers of increasing quality and expense, but have had limited success in closing the gap. More specifically, the industry has fervently researched and improved the design of the drivers (Cones, etc.) but have not significantly improved the enclosure or resonant cavity to which these drivers are coupled. The prior art has failed to develop a speaker enclosure sufficiently superior to the rectangular box-like enclosure and has not been successful in resorting to new geometrical configurations to eliminate the hereinafter described problems with speaker enclosures.

It should be noted at this point that the main goal of the hi-fi industry is to perform the conversion of audio voltages to density waves of audible frequency and amplitude in a manner that minimizes the distortion while maximizing the "liveliness" or "life-like" character of the reproduced sound. The former is a measurable physical characteristic, while the latter is a complex psycho-acoustical quality subject to individual taste and preferences. It should be further noted that the present invention claims as advantages improvement in minimizing the amount of distortion, improving efficiency by utilizing the energy of the backwave, and improving the "presence" character of the sound by the omnidirectional propagation of a broad wave front of low curvature, particularly in the important middle ranges, and improving the frequency response of speakers by minimizing backwave interference, all of which are inherent in the design configuration of the speaker enclosure, and is not directed to improvement in the "liveliness" character of the reproduced sound, which is merely a design preference.

A primary problem with the poor frequency response of the speaker-enclosure has been that the sound which is heard from the speaker is produced by a combination of the speaker and its enclosure. More specifically, the speaker radiates sound from both the front and the rear of the speaker cone. In other words, as the speaker cone moves forward the air or atmosphere in front of the cone is compressed and simultaneously the forward motion of the cone causes a rarefication of the air along the back surface of the cone. On the reverse or backward movement of the cone, this action is reversed and the air in front of the cone is rarefied while the air behind the cone is simultaneously compressed. This leads to a situation where the sound in the front of the speaker or the front wave, as opposed to the sound behind the speaker, or back wave, is 180° out of phase relative to the other. The most significant problem with this back-wave is that it reflects from the back panel or other surfaces of the prior art box enclosures into the back surface of the speaker cone and causes distortion by interfering with its mechanical movement. The distortion is of the "flubby" type which destroys crispness and generally deteriorates the quality of the sound. Further, if vented to the exterior, it joins with the front wave but is out of phase with it at most frequencies and causes interference patterns, including cancellation and reinforcement, within the listening area.

In the schemes of the prior art which attempt to overcome the well-known problems of the back sound waves, various obstacles have been incorporated into the enclosure to attempt to eliminate the back-wave interference. More specifically, a rear back panel, lying in a perpendicular plane to the center axis of the speaker cone, has been provided with padding of various sound-absorbing materials, attempting to dampen out and absorb the back-wave. Also, various geometric configurations have been attempted to eliminate or reroute the back-wave. Additionally, by making the length from the rear of the speaker to the back rear wall a certain predetermined distance, some prior art devices have attempted to make the reflected wave from the back rear wall to be in phase with the front wave, and thereby reinforcing the front wave. However, due to the wide range of frequencies, sometimes ranging from 30 CPS to 20,000 CPS, this reinforcing technique has proven impractical. The following are patent references which show the various prior art devices that incorporate the above-described prior art constructions: U.S. Pat. Nos. 2,315,896; 2,806,546; 2,825,419; 2,839,150; 2,866,517; 2,926,740; 3,412,824; 3,523,589; 3,578,103; 3,771,621; 3,885,326; 4,044,855; 3,923,124; 3,235,028; 3,627,948; 4,033,430; French Pat. Nos. 1,152,660; 2,858,899; 2,975,852; 3,186,509; 3,912,866; 2,206,012; 2,337,213; 2,787,332; 2,805,729; 2,806,547; 3,203,502; 3,578,103; 3,929,124; Italian Pat. No. 569,952; French Pat. No. 639,302, British Pat. No. 848,427, Des. 225,865 and Des. 226,567.

The normal box-like speaker enclosures of the prior art generally radiates sound in a cone-shaped pattern from the front panel. When two such enclosures are combined in spaced apart relationship, as is the typical practice, the directional radiation of sound creates a "hole" between the two sources. Speaker placement and acoustic environment become critical factors, and stereo image is hindered.

With the above described separated stereo pair, when two or more wave fronts converge they form a "resultant" wave front of lesser curvature than any of them. The quality of "presence" lies in the shape of the external wave front reaching the ears of the listener. This advantage somewhat depends on the ability of the ear to analyze the curvature of a wave front—near or far, big or little. For example, an orchestra puts out a broad wave front from a wide area together with reverberations from the surrounding acoustic chamber, and the audience hears this as "presence." When the sound is recorded and then reproduced in the box-speaker enclosure of the prior art, the "presence" is lost and the listener knows very well that the sound is being beamed at him from a small source.

In summary, the schemes of the prior art have failed to improve the cabinet or enclosure of the speakers to effectively eliminate the back wave problem, and therefore the industry has turned to expensive improvements of the speaker itself, with limited success in eliminating distortion.

SUMMARY OF THE INVENTION

The present invention is directed toward an acoustical reproducing apparatus for reproduction of sound vibrations with a maximum degree of fidelity comprising a speaker unit in combination with a cabinet enclosure having defined interiorly therein a resonating chamber. The resonating chamber has an essentially rhombic dodecahedron configuration having two or more opposed rhombi with speaker openings, or with one or more corners thereof truncated and terminated with a baffle plate having an opening therein for mounting a speaker unit, and/or having one or more zones elongated or shortened and provided with either or both means of speaker mounting.

It is an object of the present invention to provide a speaker enclosure which allows the speaker to perform over a wide frequency range with a minimum of distortion. More specifically, it is an object to provide a speaker cabinet which allows for low and high sound frequencies to be reproduced with a high order of efficiency and fidelity and wherein distortion commonly encountered with the prior art speaker enclosures is reduced, minimized or eliminated.

A further more detailed object of the present invention is to provide a speaker enclosure which allows for a substantial increase in the frequency range in which acoustical reproduction can occur with minimum distortion.

A more detailed object of the present invention is to provide a speaker enclosure which minimizes the interference of the backwave with the action of the speaker.

A further more detailed object of the present invention is to provide a speaker enclosure which seals in the back wave and utilizes its energy to propagate sound from the relatively large surface area of the enclosure.

A further more detailed object of the present invention is to provide a speaker enclosure which improves the quality of the sound by sealing in the back wave so that it is not emitted out of phase so as to cause interference with the front wave.

Yet another object of the present invention is to provide a speaker enclosure which improves the "presence" character of the sound by the omnidirectional propagation of a broad wave front of low curvature.

A related object of the present invention is to provide a speaker enclosure in which speaker placement and acoustic environment with a widely separated stereo pair of such speaker enclosures cease to be critical factors and stereo image is significantly improved.

Another object of the present invention is to provide a novel speaker enclosure in which low, medium and high frequency ranges of sound are faithfully reproduced with a high degree of fidelity so that less expensive speaker units can be incorporated therein without sacrificing the quality of sound.

A related more specific object of the present invention is to provide a speaker enclosure in which there is no "boominess" or distortion of the tones reproduced over a very wide frequency range.

A related more specific object of the present invention is to provide a speaker enclosure in which it is unnecessary to try to achieve "zero resonance" in the design by means of massive construction and dampers, such as tar.

Yet another related object of the present invention is to provide a speaker enclosure which improves the efficiency of the speaker unit.

In summary, it is the object of the present invention to provide a speaker enclosure which (1) minimizes the amount of distortion, (2) improves efficiency by utilizing the energy of the backwave, (3) improves the "presence" character of the sound by the omnidirectional propagation of a broad wave front of low curvature, and (4) improves the frequency response of speakers by minimizing backwave interference; all of which are inherent in the design configuration of the speaker enclosure of the present invention and not directed toward mere design preferences, such as the "liveliness" character of the reproduced sound, and not directed toward being an "ornamental" design.

BRIEF DESCRIPTION OF THE DRAWINGS

Further objects and advantages of the present invention will become apparent as the following description proceeds, taken in conjunction with the accompanying drawings in which:

FIG. 1 is a perspective view of the present invention showing the resonating chamber 14 having a shape or configuration of a rhombic dodecahedron, without one of the corners being truncated and therefore not including the speaker unit.

FIG. 2 is a view of the rhombic dodecahedron cabinet enclosure as viewed from a direction which provides a cube view of the same.

FIG. 3 is a view of the rhombic dodechedron shaped cabinet enclosure as viewed from a direction which is a WUNDT prism view.

FIG. 4 is a view of the rhombic dodechedron shaped cabinet enclosure from yet another direction which provides a four panel geometric image.

FIG. 5 shows the view of FIG. 4 with one of the corners of the speaker enclosure being truncated for the mounting of a baffle and speaker unit.

FIG. 6 shows the view of FIG. 2 with one of the corners being truncated to provide for the mounting of a baffle and speaker unit.

FIG. 7 shows the view of FIG. 2 with one of the corners being truncated along the major axis of three of the rhombis-shaped panels so as to provide a mounting for a baffle and speaker unit.

DESCRIPTION OF THE PREFERRED EMBODIMENT

Figure 8:
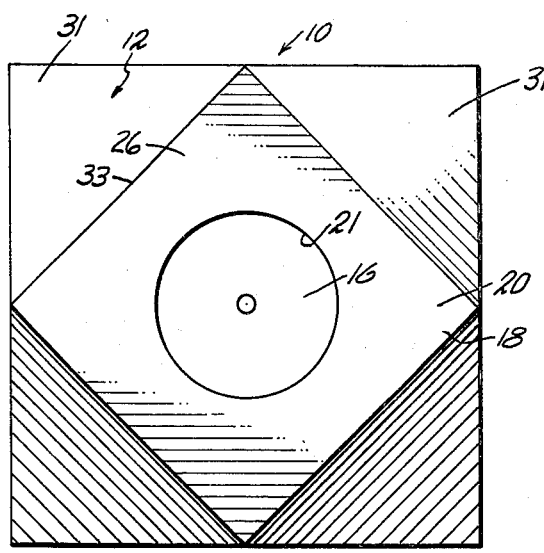
FIG. 8 shows the view of FIG. 4 with one of the corners of the speaker enclosure having a maximum truncation for mounting a baffle and speaker unit.

An acoustical reproducing apparatus, generally identified and represented by the reference numeral 10, has a configuration which is illustrated, partially by a dotted outline, in FIG. 1. As shown in FIGS. 5–7 the acoustical reproducing apparatus 10 comprises a cabinet enclosure 12 and speaker means 16 in the form of a conventional speaker unit which can be of any type well known in the art. The cabinet enclosure 12 has formed therein a resonating chamber 14, the specific configuration of the same being where the present invention resides.

As illustrated in the embodiment of FIG. 5, the resonating chamber 14 has the shape or configuration of a rhombic dodecahedron with a truncated corner 18 being formed into a baffle plate 20. The baffle plate 20 has an opening 21, wherein the speaker unit 16 is mounted. The means and manner of mounting the speaker units 16 to the baffle plate 20 is accomplished in a conventional manner.

In the embodiment of FIG. 5, before one or more corners are truncated, the cabinet enclosure 12 comprises the above mentioned rhombic dodecahedron configuration. More specifically, a rhombic dodecahedron, a geometric description known in other arts but not in the subject art, comprises twelve rhombi. Each rhombus has a pair of opposed 70° corner angles and a pair of opposed 110° corner angles. Each of the rhombi lies in a plane that forms a 120° angle with the adjacent rhombi. This angle is normally referred to as the dihedral angle. Each rhombus has a major axis which bisects the pair of opposed 70° corner angles, and a minor axis which bisects the pair of opposed 110° corner angles. Moreover, each of the four sides of each of the rhombi adjoins one of the sides of another of the rhombi. This particular geometric configuration is particularly hard to draw in a single view and have a meaningful representation. Generally, as is well known in the art, the rhombic dodecahedron has three general geometric two-dimensional views. As shown in FIG. 2, the rhombic dodecahedron has a cube view, and when viewed this way, the complete rhombic dodecahedron comprises four tri-panels, each tri-panel comprising the three panels visible in FIG. 2. Likewise, when viewing the rhombic dodecahedron from another direction, as depicted in FIG. 3, the five panel view generally known as the WUNDT prism is visible. Moreover, when viewing the rhombic dodecahedron from yet another direction as illustrated in FIG. 4, the same provides a four panel geometric image.

Applying the well-known geometric descriptions of the preceeding paragraph, the cabinet enclosure 12 of the embodiment of FIG. 5 comprises a plurality of rhombus-shaped panels 28. For the purpose of defining and claiming the present invention, each of the rhombus-shaped panels 28 will be generically described as being a parallelogram-shaped panel 27. More specifically, the parallelogram-shaped panels 27 of FIG. 1 are a geometric special case wherein all sides are dimensionally equal, thereby defining the rhombus-shaped panels 28. Hereinafter, other embodiments will have parallelogram-shaped panels 27 which only have opposed sides which are dimensionally equal. All the parallelogram-shaped 27 have in common the heretofore described pair of opposed 70° corner angles and the pair of opposed 110° corner angles. For the purposes of describing the invention, the rhombic dodecahedron shaped resonating chamber 14 is defined to have a plurality of corners 17. Each of the corners is defined by the joinder of either three or four of the rhombus-shaped panels 28. More specifically, in the rhombic dodecahedron shaped resonating chamber 14, the rhombus-shaped panels either meet to define four edged corners 30 or three edged corners 32. The four edged corners 30 are formed by the joinder of substantially half of each of the four rhombus-shaped panels 28, taken along the minor axis 33 of the same, while the three edged corners 32 are formed by the joinder of substantially half of each of the three rhombus-shaped panels 28 taken along the major axis 34 of the same. Therefore, defining each rhombus-shaped panel 28 to have two integral half rhombus portions 29 along the major axis 34 and two integral half rhombus portions 31 along the minor axis 33, it can be seen that each half rhombus portion 29 and 31 contributes to the formation of a corner 17.

In the embodiments of FIGS. 5 through 8, for the purposes of mounting the speaker unit 16 in the resonating chamber 14, one or more corners of the rhombic dodecahedron configuration are truncated to form one or more truncated corners 18. As illustrated in FIGS. 5–8, there are several ways in which to create a truncated corner 18 of the resonating chamber 14 so as to provide the increase in sound fidelity of the present invention. A corner is truncated to provide a mounting place for speaker unit 16, and this truncated corner can be either a four-edged corner 30, or a three-edged corner 32. In a pyramid truncation illustrated in FIG. 5, a four-edged corner 30 is truncated so as to allow the truncated corner 18 to terminate in a quadrilateral, and more specifically, a square-shaped baffle plate 26. The preferred truncation arrangement is illustrated in FIG. 8 wherein the four-edged corner 30 has the maximum truncation along the minor axis 33 of the rhombus-shaped panels 28 which form the four-edged corner 30. As illustrated in FIGS. 6 and 7, a three-edged corner is truncated so that the truncated corner 18 terminates in an equilateral triangular-shaped baffle plate 24. The degree of truncation of the truncated corner 18 is merely a matter of design preference in that the more truncation provided, the larger the dimensions of baffle plate 20. The larger the dimensions of baffle plate 20, the greater the diameter of the mounted speaker unit 16 attached thereto can have. Generally, for the purposes of illustration, a central axis is defined to extend from the outermost point of one corner 17 to the outermost point of an oppositely disposed corner 17, as illustrated in FIG. 1. In a rhombic dodecahedron, for every three-edged corner 32 or four-edged corner 30, there is an oppositely disposed three-edged corner 32 and four-edged corner 30 respectively. As is common with all of the truncated corner embodiments of the present invention, the baffle plate 20 is substantially perpendicular to the center axis formed between the truncated corner 18 and the oppositely disposed corner 17.

As previously mentioned, the degree of truncation of the truncated corner 18 is a matter of design preference. If the truncated corner 18 is a three-edged corner 32, then the truncation can occur at the major axis 34 of the rhombus-shaped panel 28 or at any point further along the panel 28 relative to its major axis. Ideally, the degree of truncation will depend upon the size of speaker one wishes to mount in the resonating chamber 14. As illustrated in FIG. 6, if the truncation occurs past the major axis 34 of the rhombus-shaped panel 28, the resulting resonating chamber comprises nine rhombus-shaped panels 28, three gem-shaped panels 35, and a single triangular shaped baffle plate 24, the triangular-shaped baffle plate 24 being congruent to the sides of three gem-shaped panels 35. As illustrated in FIG. 7, if the truncation of the three-edged corner 32 is increases so as to truncate the rhombus-shaped panel 28 at their major axis, the resonating chamber 14 will comprise three half-rhombus portions 29, nine rhombus-shaped panels 28, and one equilateral triangular-shaped baffle plate 24, such equilateral triangular-shaped baffle plate 24 being congruent to the three half rhombus portions 29. If there is a truncation of a four-edged corner 30, the same flexibility in the degree of truncation applies as with the three-edged corner 32. More specifically, the maximum amount of truncation can be the termination of the rhombus-shaped panels 28 at their minor axis 33, as shown in FIG. 8. Also, any truncation less than that, at a position outward from the minor axis, is within the scope of the present invention. If the truncation occurs at the minor axis 33, the resonating chamber 14 comprises four half rhombus portions 31, eight rhombus-shaped panels 28, and one square-shaped baffle plate 26, such baffle plate 26 being congruent to the four half rhombus portions 31. As shown in FIG. 5, if the truncation is less than along the minor axis 33, the resonating chamber 14 comprises four gem-shaped panels 38, eight rhombus-shaped panels 28, and one square-shaped baffle plate 26 congruent with the four gem-shaped panels 38.

Figure 9:
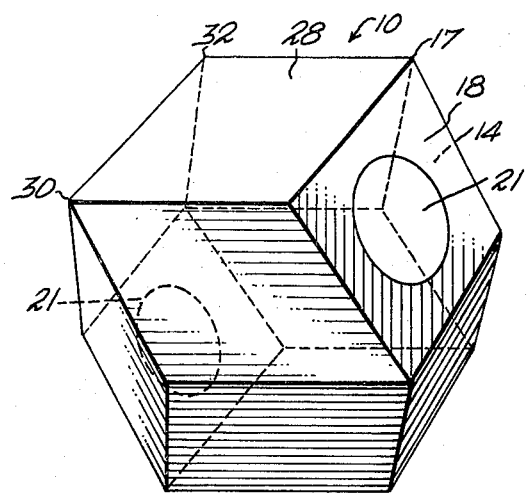
FIG. 9 shows an embodiment with maximum speaker openings on opposed rhombi of the configuration of FIG. 1.

Additionally, openings 21 for mounting speaker units 16 may be provided on one or more opposing rhombus-shaped panels 28, as shown by FIG. 9. Although one speaker unit 16 mounted in one rhombus-shaped panel 28 is considered within the scope of this invention, better sound reproduction has been accomplished by mounting at least one pair of the speaker units 16 in a pair of the openings 16 on opposed rhombus-shaped panels 28, as illustrated in FIG. 9.

Figure 10:
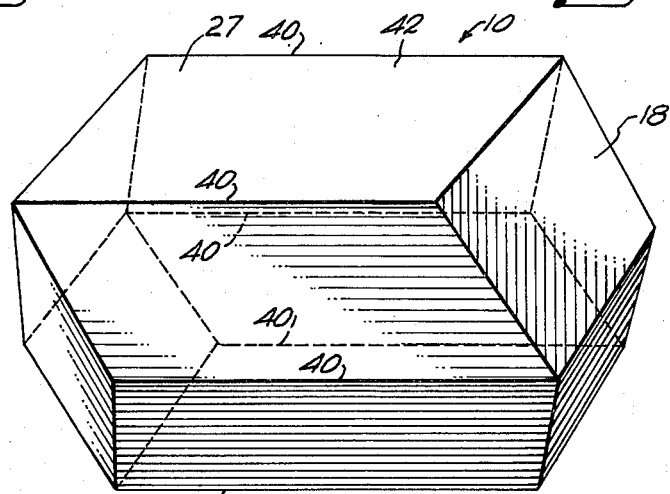
FIG. 10 shows an embodiment with an elongated zone with respect to the configuration of FIG. 1.
Figure 11:
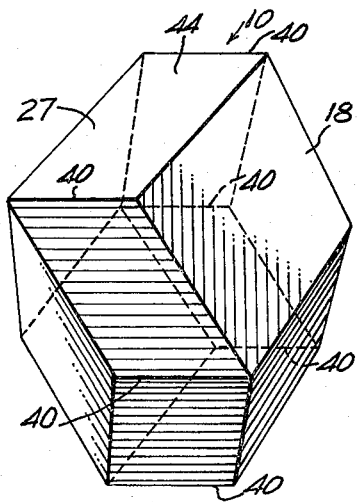
FIG. 11 shows an embodiment with a shortened zone with respect to the configuration of FIG. 1.

The basic rhombic dodecahedron configuration illustrated in FIG. 1 and the resulting acoustic resonating chamber 14 may also be altered without loss of acoustic effectiveness by the elongation and/or shortening of one or more zones, as illustrated in FIGS. 10 and 11. A zone of a polyhedron is a band of parallel edges. One such zone is illustrated in FIGS. 9, 10 and 11 by six parallel edges 40. Thus a rhombic dodecahedron has four bands of six parallel edges each, for a total of 24 edges. A property of a zone is that it can be elongated or shortened without any changes in the angles of the configuration or in the lengths of the edges of other zones. Therefore, a rhombic dodecahedron may be so changed that it can no longer be termed a rhombic dodecahedron but rather something like a rhombo-parallelogramo-dodecahedron; but, since there is no change in the essential angles, there is no loss of the acoustic advantages inherent in a structure having those angles.

Referring to FIG. 10, there is illustrated a variation to the configuration of the resonating chamber 14 as illustrated in FIG. 1. As previously explained, one of the zones, defined by parallel edges 40, is elongated with respect to the same zone in FIG. 1. Hence, the rhombus-shaped panels 28 of FIG. 1, which adjoin the parallel edges 40, became elongated parallelogram panels 42 in FIG. 10. In this embodiment, the parallelogram-shaped panels 27 include at least six elongated parallelogram panels 42, assuming that none of the panels 42 are truncated to mount a speaker unit 16. Referring to FIG. 11, one of the zones, defined by parallel edges 40, is shortened with respect to the same zone in FIG. 1. Hence, the rhombus-shaped panels 28 of FIG. 1, which adjoin the parallel edges 40, become shortened parallelogram panels 44. In this embodiment, the parallelogram shaped panels 27 include at least six shortened parallelogram panels 44, assuming that none of the panels 44 are truncated to mount a speaker unit 16. It is clear that the rhombus-shaped panels 28 are just a special geometric arrangement wherein the zone is selected so that the parallel edges 40 are equal in length to all other edges of a given rhombus-shaped panel 28. Clearly, the rhombus-shaped panel 28 is a special case parallelogram, and will be referred to as such in the claims so that the claims will include a resonating chamber 14 with one or more elongated and/or shortened zones. Although not illustrated for the purposes of clarity, the speaker mountings in the configuration modifications of FIGS. 10 and 11 are the same as those already disclosed. More specifically, as illustrated in FIGS. 5 through 8, the four edged corners 30 and the three edge corners 32 can be truncated to define a truncated corner 18 for mounting the baffle plate 20, such baffle plate 20 having the opening 21 for the speaker unit 16. Alternatively, as illustrated in FIG. 9, the speaker unit 16 can be mounted in any of the panels of the resonating chamber 14, whether the panel be a rhombus-shaped panel 28, an elongated parallelogram panel 42 or a shortened parallelogram panel 44. Preferably, as previously explained, a pair of speaker units 16 should be mounted in oppositely disposed rhombus-shaped panels 28, oppositely disposed elongated parallelogram panels 42, or oppositely disposed shortened parallelogram panels 44. Since it is preferable to make the plane of baffle plate 20 perpendicular to a line between opposed corners 17, the baffle plate may have a four sided configuration other than square configuration in the case of the truncation of a four-edged corner 30 and may have a three sided configuration other than an equilateral triangle configuration in the case of the truncation of a three-edged corner 32. It should be appreciated that various possible combinations of shortened zones and elongated zones are possible in that there are four zones, all of which can have bands of parallel edges 40 with different band lengths. As previously explained, the angles remain constant no matter what the zone lengths.

The rhombic dodecahedron configuration and its derivative configurations made by the elongating and/or shortening of zones, were found to have definite acoustic advantages over other geometric shapes used in the prior art. The volume of air contained within the confines of these particular configurations, when energized by the audio frequencies imparted by the speaker cone, resonates in a way peculiar to this specific combination of angles of 70 degrees and 110 degrees defining the rhombi and/or parallelograms, and their dihedral angles of 120 degrees.

The surface area-to-volume ratio of the rhombic dodecahedron is known to be the smallest of any familiar polyhedron, which we find exemplified by the bee's cell. D'Arcy Thompson in his book *On Growth and Form* (Cambridge University Press, London, 1961, Page 120) says of the rhombic dodecahedron: "... that of the ordinary space-filling solids with all sides plane and similar, this one has the least surface for its solid content." That this peculiarity of the shape imparts acoustic advantages to an enclosed volume of air was not realized or appreciated until discovered and utilized in the present invention.

It has also been discovered that the acoustic advantages carry over into the shapes derived from the rhombic dodecahedron made by elongating and/or shortening any zone or zones, which as previously described do not change any of the angles of the rhombic dodecahedron configuration.

It should be noted that the use of other geometric solids in the prior art failed to improve the acoustics to any significant extent, but were merely decorative or served as a means of aiming a multiplicity of speakers in various directions. Constructed of heavy, rigid materials such as veneered chipboard and using sound-deadening padding, they are in no way similar to the present invention either in their intent or in their construction.

As previously noted, the backwave energy is to a large extent utilized in this invention to cause vibration of the surface of the enclosure. Therefore the choice of materials used in the construction of this invention is determined by the same considerations as determine those of a musical instrument, such as a cello or a guitar. Light, unpadded resilient materials capable of functioning as a sounding board such as light plywood, plastic laminate, sheet aluminum, etc., are the preferred materials in contrast with the heavy rigid materials and padding of the prior art.

Referring to the previously mentioned improvement in "presence" resulting from the present invention, the improvement lies in the shape of the external wave front reaching the ears of the listener. The second produced by this invention comes not only from the speaker cone or cones of the speaker unit 16 but also from the relatively large area of the rhombus-shaped panels vibrating in response to energy released by the backwave in a manner similar to a sounding-board. As previously explained when the sound is recorded and then reproduced in a prior art box-like speaker enclosure the "presence" is lost and the listener is well aware of the sound being beamed at him from a small source.

When two of the cabinet enclosures 12 are used as a widely separated stereo pair, the improvement in presence is outstanding and far beyond anything found in the prior art devices. This may be explained by the fact that the cabinet enclosures 12 produce omnidirectional sound radiation from a large surface area while the prior art boxes radiate from the speaker cones in a beaming pattern, as previously described. The almost spherical radiation of sound from the entire surface of the cabinet enclosures 12 eliminates the previously described "hole" between sources which, as previously discussed, so plagues the prior art. With the cabinet enclosure of the present invention sound can be characterized as emanating in substantially spherical shaped waves as opposed to the cone shaped waves of the prior art boxes. Speaker placement and acoustic environment cease to be critical factors, unlike the prior art, and stereo image is greatly improved. This is an advantage inherent in the shape of the enclosure 12 and is not mere design preference.

Although particular embodiments of the invention have been shown and described in full here, there is no intention to thereby limit the invention to the details of such embodiments. On the contrary, the intention is to cover all modifications, alternatives, embodiments, usages and equivalents of the subject invention as fall within the spirit and scope of the invention, specification and the appended claims.

What is claimed is:

1. In an acoustical reproducing apparatus having a resonating chamber and a speaker means mounted in said resonating chamber, the improvement comprising:
    said resonating chamber including a plurality of parallelogram-shaped panels,
    each said parallelogram-shaped panel having pairs of opposed corner angles of approximately 70° and 110°,
    each said parallelogram-shaped panel disposed in a plane forming an approximate 120° angle with each of the adjacent said rhombus-shaped panels,
    each said parallelogram-shaped panel being formed of relatively thin substantially non-sound absorbing material and having an interior surface which is planar and unpadded.

2. In the acoustical reproducing apparatus of claim 1,
    the sides of each of said parallelogram-shaped panels being attached to the side of another said parallelogram-shaped panel to define a plurality of four edge corners and three edge corners for said resonating chamber,
    at least one of said corners being truncated to terminate with a baffle plate,
    said baffle plate having an opening therein for the speaker means.

3. In the acoustical reproducing apparatus of claim 2,
    wherein said baffle plate is disposed in a plane being substantially perpendicular to a center axis passing from said truncated corner to an oppositely disposed corner of said resonating chamber.

4. In the acoustical reproducing apparatus of claim 3,
    said truncated corner comprising one of said three edge corners,
    said baffle plate having substantially a three-sided configuration.

5. In the acoustical reproducing apparatus of claim 3,
    said truncated corner comprising one of said four edge corners,
    said baffle plate having substantially a four-sided configuration.

6. In the accoustical reproducing apparatus of claim 4,
    each said parallelogram-shaped panel comprising a rhombus-shaped panel,
    said truncated three edge corner formed from three truncated rhombus-shaped panels, each said truncated rhombus-shaped panel being truncated along a line intermediate to the major axis and the outmost point of said rhombus-shaped panel,
    a triangular shaped said baffle plate mounted in congruent relationship to said truncated rhombus-shaped panels,
    whereby each truncated rhombus-shaped panel forms a gem-shaped panel.

7. In the acoustical reproducing apparatus of claim 4,
    each said parallelogram-shaped panel comprising a rhombus-shaped panel,
    said truncated three edge corner formed from truncated rhombus-shaped panels, each said truncated rhombus panel being truncated along the major axis of the same,
    a triangular shaped said baffle plate mounted in congruent relationship to said truncated rhombus-shaped panels, whereby each said truncated rhombus-shaped panel defines a half rhombus portion taken along the major axis.

8. In the acoustical reproducing apparatus of claim 5, each said parallelogram-shaped panel comprising a rhombus-shaped panel, said truncated four edge corner formed from four said rhombus-shaped panels, each said rhombus-shaped panel being truncated along a line intermediate to the minor axis and the outmost point of said rhombus-shaped panel, a square-shaped said baffle plate mounted in congruent relationship to said truncated rhombus-shaped panels, whereby each truncated rhombus-shaped panel forms a gem-shaped panel.

9. In the acoustical reproducing apparatus of claim 5, each said parallelogram-shaped panel comprising a rhombus-shaped panel, said truncated four edge corner formed from four said rhombus-shaped panels, each said rhombus-shaped panel being truncated along the minor axis of the same, a square-shaped said baffle plate attached to the truncated edges of said truncated rhombus panels, whereby each said truncated rhombus-shaped panel defines a half rhombus portion taken along the minor axis.

10. In the acoustical reproducing apparatus of claim 1, said speaker means, a first speaker means, being mounted in one of said parallelogram-shaped panels.

11. In the acoustical reproducing apparatus of claim 10, a second speaker means being mounted in one of said parallelogram-shaped panels disposed in opposed relationship to said parallelogram-shaped panel having said first speaker means mounted therein.

12. In the acoustical reproducing apparatus of claim 1, each of said parallelogram-shaped panels comprising a rhombus-shaped panel.

13. In the acoustical reproducing apparatus of claim 1, the equally dimensional, parallel edges of said parallelogram-shaped panels defining a zone, whereby four said zones are defined, at least one said zone having the equally dimensional, parallel edges longer than the equally dimensional, parallel edges of at least one of the other said zones, whereby at least one elongated zone is formed.

14. In the acoustical reproducing apparatus of claim 1, the equal dimensional, parallel edges of said parallelogram-shaped panels defining a zone, whereby four said zones as defined, at least one said zone having equally dimensional, parallel edges that are shorter than the equally dimensioned, parallel edges of at least one of the other said zones, whereby at least one shortened zone is formed.

* * * * *